(12) United States Patent
Ding

(10) Patent No.: US 9,041,967 B1
(45) Date of Patent: May 26, 2015

(54) PRINTING SYSTEM AND DATA TRANSMISSION METHOD THEREOF

(71) Applicants: XYZprinting, Inc., New Taipei (TW); Kinpo Electronics, Inc., New Taipei (TW); Cal-Comp Electronics & Communications Company Limited, New Taipei (TW)

(72) Inventor: Ming-Hsiung Ding, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

(*) Notice: Subject to any disclaimer, the term of this patent is extended or adjusted under 35 U.S.C. 154(b) by 0 days.

(21) Appl. No.: 14/182,289

(22) Filed: Feb. 18, 2014

(30) Foreign Application Priority Data

Dec. 3, 2013 (TW) .............................. 102144218 A

(51) Int. Cl.
*G06F 15/00* (2006.01)
*G06F 3/12* (2006.01)
*G06K 1/00* (2006.01)

(52) U.S. Cl.
CPC ............ *G06F 3/1222* (2013.01); *G06F 3/1238* (2013.01)

(58) Field of Classification Search
CPC ... G06F 3/1222; G06F 3/1238; G06F 3/1296; G06K 15/00; G06K 15/02
USPC ........................................... 358/1.1, 1.15, 1.9
See application file for complete search history.

(56) References Cited

U.S. PATENT DOCUMENTS

| 5,873,837 A * | 2/1999 | Lieber et al. .................. 600/504 |
| 2011/0063685 A1* | 3/2011 | Suzuki ......................... 358/3.28 |

\* cited by examiner

*Primary Examiner* — Douglas Tran
(74) *Attorney, Agent, or Firm* — Jianq Chyun IP Office

(57) ABSTRACT

A printing system and a data transmission method thereof are provided. The printing system includes a peripheral unit and a controller. The peripheral unit is configured to execute a data printing function and includes a digital data. The controller is coupled to the peripheral unit. The controller converts a digital control command to obtain an analog control signal, and transmits the analog control signal to the peripheral unit. The peripheral unit converts the analog control signal into the digital control command when the analog control signal is received by the peripheral unit. The peripheral unit converts a corresponding digital data into an analog signal according to the digital control command to transmit the analog signal to the controller.

17 Claims, 6 Drawing Sheets

PRINTING SYSTEM AND DATA TRANSMISSION METHOD THEREOF

CROSS-REFERENCE TO RELATED APPLICATION

This application claims the priority benefit of Taiwan application serial no. 102144218, filed on Dec. 3, 2013. The entirety of the above-mentioned patent application is hereby incorporated by reference herein and made a part of this specification.

BACKGROUND

1. Technical Field

The technical field relates to a printing system and a data transmission method thereof, and more particularly, relates to a data transmission method for transmitting an analog signal and a printing system using the same.

2. Description of Related Art

With the blooming development in electronic technologies and various advanced functions provided by various electronic devices, the electronic devices and people are closely bonded together in daily life. Among which, a business machine for printing data (e.g., a photocopier, a printer and so on) has become an indispensable tool in modern office. Along with continuous development in new technologies, copying technologies in 2D can no longer satisfy people nowadays. In recent years, a three-dimensional printing technology (i.e., 3D printing technology) is developed for printing a 3D object as a copy, so that products may be quickly and cheaply manufactured.

Both a traditional 2D printing device and a 3D printing device may include a printing nozzle for spraying inks or consumables, an ink cartridge for storing inks, a consumable cartridge for storing consumables, and other peripheral components related to printing functions. A controller in a printing system may connect to the peripheral components through various connecting interfaces including an Inter-Integrated Circuit (I2C), a Serial Peripheral Interface Bus (SPI) or an one wire interface, so as to control the peripheral components to perform normal printing tasks.

However, in above-said connecting interfaces of conventional art, the controller and the peripheral components are communicated by using a digitized data transmission. In other words, according to a high electric potential and a low electric potential, data transmitted in said interfaces are divided in data of two bits "0" and 1". Because the digitized data transmission method is used, persons with bad intension may easily capture and analyze the data transmitted through a digital transmission interface by using a logic analyzer, resulting a poor confidentiality and an insufficient security for the data. Therefore, how to improve the confidentiality and the security for the data in the printing system is one of the major subjects for person skilled in the art.

SUMMARY

Accordingly, one of exemplary embodiments is directed to a printing system and a data transmission method thereof, capable of improving a data confidentiality by using a customized analog transmission mode.

One of exemplary embodiments provides a printing system, which includes a peripheral unit and a controller. The peripheral unit is configured to execute a data printing function and includes a digital data. The controller is coupled to the peripheral unit. The controller converts a digital control command to obtain an analog control signal, and transmits the analog control signal to the peripheral unit. The peripheral unit converts the analog control signal into the digital control command when the analog control signal is received by the peripheral unit. The peripheral unit converts a corresponding digital data into an analog signal according to the digital control command to transmit the analog signal to the controller.

According to one of exemplary embodiments, the digital control command is converted into the analog control signal having a plurality of voltage levels according to a signal transmission format, and the digital data is converted into the analog signal according to the signal transmission format. The signal transmission format includes a time length of a preset time slot and the voltage levels.

According to one of exemplary embodiments, the controller includes a first digital-to-analog converter. The first digital-to-analog converter converts the digital control command into the analog control signal having the voltage levels according to the signal transmission format. The first digital-to-analog converter transmits the analog control signal to the peripheral unit.

According to one of exemplary embodiments, the first digital-to-analog converter encodes the digital control command into a plurality of command symbols, and generates the analog control signal according to each of the voltage levels corresponding to each of the command symbols.

According to one of exemplary embodiments, a part or all of the command symbols include a check code.

According to one of exemplary embodiments, the peripheral unit includes a first analog-to-digital converter. The first analog-to-digital converter converts the analog control signal transmitted by the controller and including the voltage levels into the digital control command according to the signal transmission format.

According to one of exemplary embodiments, the first analog-to-digital converter obtains a plurality of corresponding command symbols according to the voltage levels of the analog control signal respectively during a continuous series of the preset time slots, and decodes the command symbols to obtain the digital control command.

According to one of exemplary embodiments, the peripheral unit includes a second digital-to-analog converter. The second digital-to-analog converter converts the digital data into the analog signal having the voltage levels according to the signal transmission format. The second digital-to-analog converter transmits the analog signal to the controller.

According to one of exemplary embodiments, the second digital-to-analog converter encodes the corresponding digital data into a plurality of data symbols according to the digital control command, and generates the analog signal according to each of the voltage levels corresponding to each of the data symbols.

According to one of exemplary embodiments, a part or all of the data symbols include a check code.

According to one of exemplary embodiments, the controller includes a second analog-to-digital converter. The second analog-to-digital converter converts the analog signal transmitted by the peripheral unit and including the voltage levels back into the digital data according to the signal transmission format.

According to one of exemplary embodiments, the second analog-to-digital converter obtains a plurality of corresponding data symbols according to the voltage levels of the analog signal respectively during a continuous series of the preset time slots, and decodes the data symbols to obtain the digital data.

According to one of exemplary embodiments, the controller transmits a setting signal to the peripheral unit according to the signal transmission format, in which a half period of the setting signal is the time length of the preset time slot, and the setting signal includes a maximum preset voltage level and a minimum preset voltage level.

According to one of exemplary embodiments, the peripheral unit analyzes the setting signal to obtain the signal transmission format, and obtains the voltage levels through the maximum preset voltage level and the minimum preset voltage level. The peripheral unit obtains the digital control command through the voltage levels and converts the digital data through the voltage levels.

One of exemplary embodiments provides a data transmission method adapted to a printing system. In the exemplary embodiment, the printing system includes a peripheral unit and a controller, and the data transmission method includes the following steps: converting a digital control command to obtain an analog control signal by the controller; transmitting the analog control signal to the peripheral unit by the controller; converting the analog control signal back into the digital control command by the peripheral unit when the analog control signal is received by the peripheral unit; and converting a corresponding digital data into an analog signal by the peripheral unit according to the digital control command to transmit the analog signal to the controller.

Based on above, in the printing system and the data transmission method thereof provided by the exemplary embodiments, each of the digital-to-analog converters in the controller and the peripheral unit may convert the digital data and the digital control command into the analog signal and the analog control signal, respectively, and transmit the digitalized data, respectively. As a result, based on the customized voltage levels and the corresponding data symbols, the confidentiality of the data may be improved while increasing the data transmission speed.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the exemplary embodiments, and are incorporated in and constitute a part of this specification. The drawings illustrate embodiments, together with the description, serve to explain the principles of the exemplary embodiments.

DESCRIPTION OF THE EMBODIMENTS

Figure 1:
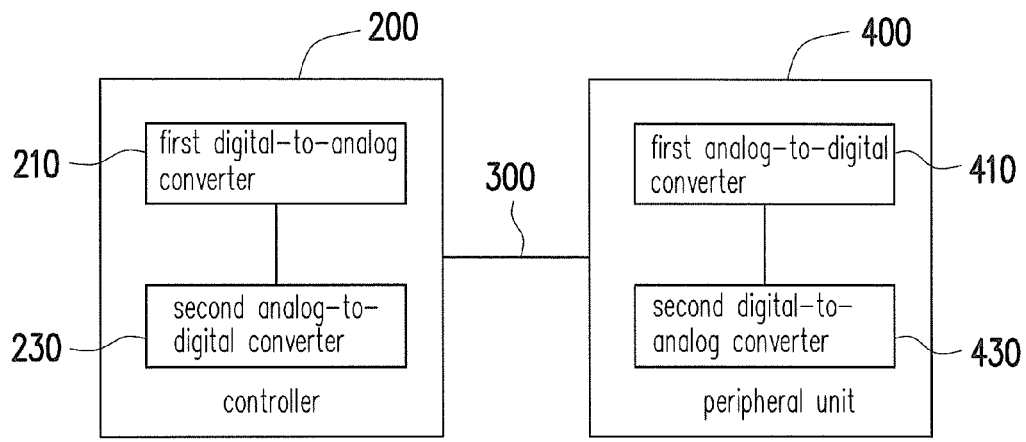
FIG. 1 is a schematic diagram illustrating a printing system according to an exemplary embodiment.

Descriptions are given with reference to the exemplary embodiments illustrated with accompanied drawings, in which same or similar parts are denoted with same reference numerals. In addition, whenever possible, identical or similar reference numbers stand for identical or similar elements in the figures and the embodiments.

FIG. 1 is a schematic diagram illustrating a printing system according to an exemplary embodiment. Referring to FIG. 1, in the present embodiment, a printing system 10 configured to execute a printing function may be a 2D printing system or a 3D printing system, and the disclosure is not limited thereto. The printing system 10 includes a controller 200 and a peripheral unit 400. The control module 200 may be configured to monitor operations of the printing system 10 entirely or partially, and a hardware thereof may include hardware devices with computing capability such as a chip set, a microprocessor, or a combination of said hardware devices. Furthermore, the controller 200 may be configured to monitor the peripheral unit 400 of the printing system 10. For instance, the peripheral unit 400 may be a data printing unit for executing printing functions, such as an ink cartridge mounted with inks, or a modeling element mounted with 3D modeling materials. For a fused deposition modeling, the peripheral unit may be an extrusion head mounted with materials provided by a material spool. The peripheral unit 400 may also be a display unit configured to display texts or printing statuses, but the disclosure is not limited thereto.

In the present embodiment, the peripheral unit 400 is configured to execute a data printing function and includes a digital data. For instance, in case the peripheral unit 400 is the ink cartridge mounted with inks, the digital data may include information such a model number of the ink cartridge, or remaining amount of the ink. In case the peripheral unit 400 is the extrusion head mounted with the materials provided by the material spool, the digital data may include information such a model number of the material spool, or remaining amount of the material spool. The controller 200 is coupled to the peripheral unit 400. In brief, the controller 200 and the peripheral unit 400 are coupled to each other through a transmission interface 300 to perform a data transmission. Herein, types and models of the transmission interface 300 are not particularly limited by the disclosure, any transmission interfaces capable of transmitting an analog signal may serve as the transmission interface 300 of the disclosure.

Further, the controller 200 includes a first digital-to-analog converter 210 and a second analog-to-digital converter 230. The peripheral unit 400 includes a first analog-to-digital converter 410 and a second digital-to-analog converter 430.

More specifically, a digital-to-analog converter (DAV) is a function module capable of converting digital signals into analog signals (in forms of currents, voltages or charges). An analogue-to-digital converter (ADC) is used to reverse abovesaid operation. In the present embodiment, the first digital-to-analog converter 210 and the second digital-to-analog converter 430 convert a digital data and a digital control command into an analog signal and an analog control signal, respectively. On the other hand, the first analog-to-digital converter 410 and the second analog-to-digital converter 230 convert the digital data and the digital control command into the digital signal and the digital control command, respectively.

Figure 2:
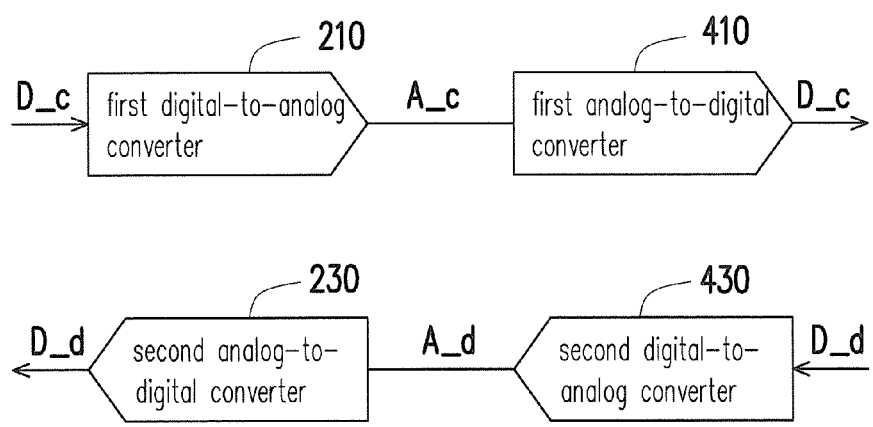
FIG. 2 is a schematic diagram illustrating a data transmission path according to an exemplary embodiment.
Figure 3:
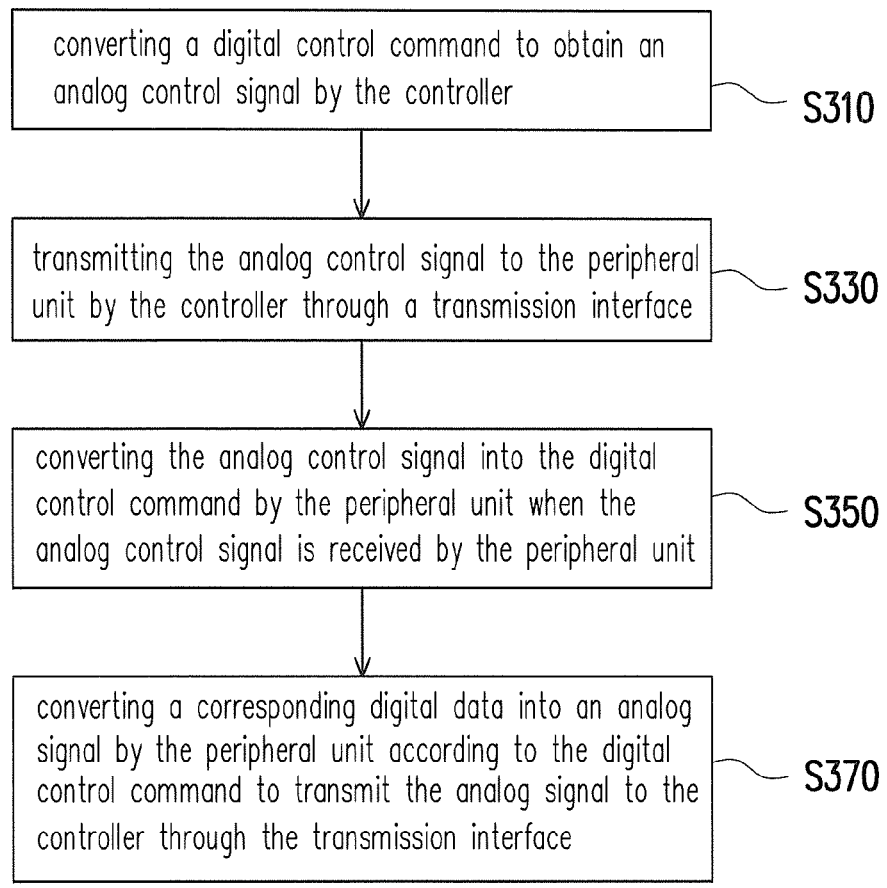
FIG. 3 is a flowchart illustrating a data transmission method according to an exemplary embodiment.

In order to describe the exemplary embodiment more clearly, FIG. 2 is a schematic diagram illustrating a data transmission path according to an exemplary embodiment, and FIG. 3 is a flowchart illustrating a data transmission method according to an exemplary embodiment. A method of the present embodiment is suitable for the printing system 10 of FIG. 1. The following detailed steps are elaborated to describe the method of the present embodiment with the reference to each element in FIG. 1. Referring to FIG. 1, FIG. 2 and FIG. 3 together.

In the present embodiment, it is assumed that the peripheral unit 400 is the ink cartridge mounted with inks, in case a user intends to replace the ink cartridge with a new one, the controller 200 may first recognize whether the model number of the ink cartridge matches a preset specification of the printing system 10. Accordingly, the controller 200 may send a control command to the peripheral unit 400 for controlling the peripheral unit 400 to report the information related to the ink cartridge.

First, in step S310, the controller 200 converts a digital control command D_c to obtain an analog control signal A_c. In brief, before the control command of "requesting for a reply regarding data of the ink cartridge" is sent by the controller 200, the first digital-to-analog converter 210 of the controller 200 receives the digital control command D_c and converts the digital control command D_c into the analog control signal A_c. It should be noted that, in the present embodiment, the digital control command D_c may be converted into the analog control signal A_c having a plurality of voltage levels according to a signal transmission format, and the signal transmission format includes a time length of a preset time slot and the voltage levels.

Figure 4:
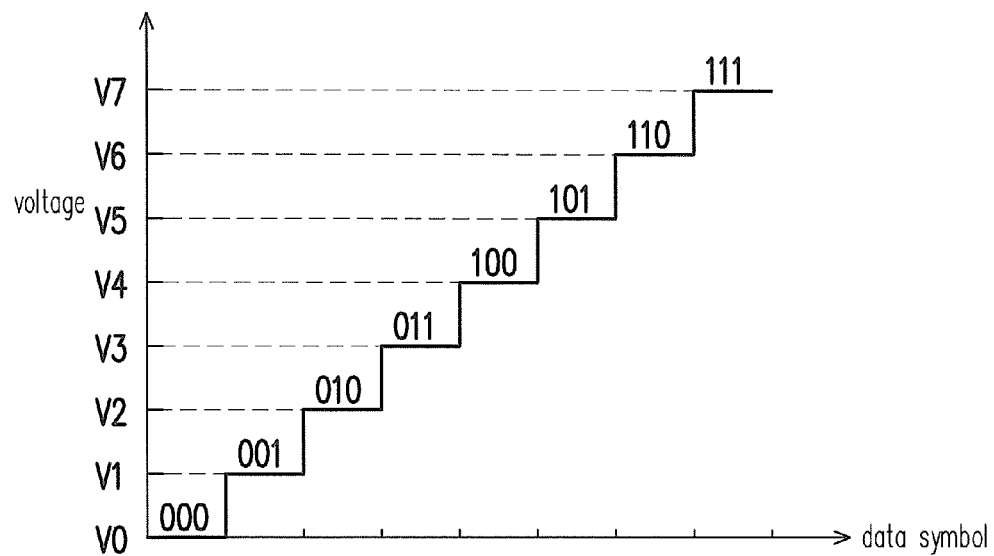
FIG. 4 is a curve diagram illustrating a conversion of a digital-to-analog converter according to an exemplary embodiment.

More specifically, FIG. 4 is a curve diagram illustrating a conversion of a digital-to-analog converter according to an exemplary embodiment. Referring to FIG. 4, it is assumed that the first digital-to-analog converter 210 is a digital-to-analog converter of 8 stages, and the first digital-to-analog converter 210 is capable of converting the digital data into 8 different voltage levels V0 to V7. In other words, each of the voltage levels V0 to V7 may represent a symbol of three bit data. As in shown in FIG. 4, the voltage level V0 represents the symbol "000"; the voltage level V1 represents the symbol "001"; the voltage level V2 represents the symbol "010"; and the voltage level V3 represents the symbol "011". The rest may be deduced by analogy, for example, the voltage level V7 represents the symbol "111". In other words, the voltage levels V0 to V7 may represent different symbols, respectively, and the first digital-to-analog converter 210 may convert the digital control command D_c into the analog control signal A_c having different voltage levels according to a converting method depicted in FIG. 4 for outputting the same to the peripheral unit 400.

However, it should be noted that, FIG. 4 is only an exemplary embodiment instead of a limitation to the disclosure. The first digital-to-analog converter 210 may also be a digital-to-analog converter of 16 stages, 32 stages or more stages, and a content in each of the symbol corresponding to each of the voltage levels may be designed based on actual applications.

In step S330, the controller 200 transmits the analog control signal A_c to the peripheral unit 400 through the transmission interface 300. Overall, the first digital-to-analog converter 210 converts the digital control command D_c into the analog control signal A_c having the voltage levels according to the signal transmission format, and transmits the analog control signal A_c to the peripheral unit 400 through the transmission interface 300.

Subsequently, in step S350, the peripheral unit 400 converts the analog control signal A_c into the digital control command D_c when the analog control signal A_c is received by the peripheral unit 400. In brief, the first analog-to-digital converter 410 converts the analog control signal A_c transmitted by the controller 200 and including the voltage levels back into the digital control command D_c according to the signal transmission format. Accordingly, the control command of "requesting for a reply regarding data of the ink cartridge" sent by the controller 200 may be received by the peripheral unit 400.

In step S370, the peripheral unit 400 converts a corresponding digital data D_d into an analog signal A_d according to the digital control command D_c to transmit the analog signal A_d to the controller 200 through the transmission interface 300. In the present embodiment, the digital data D_d corresponding to the digital control command D_c includes the model number of the ink cartridge of the peripheral unit 400, and the digital data D_d is converted into the analog signal A_d also according to the signal transmission format. In other words, the second digital-to-analog converter 430 converts the digital data D_d into the analog signal A_d having the voltage levels according to the signal transmission format. Therein, a digital-to-analog converting method thereof is identical a digital-to-analog converting method used by the first digital-to-analog converter 210 in FIG. 4, thus related description is omitted hereinafter. Thereafter, the second digital-to-analog converter 430 transmits the analog signal A_d to the controller 200 through the transmission interface 300. Accordingly, the analog signal A_d regarding the model number of the ink cartridge may then be received by the controller 200, and the analog signal A_d may be converted to obtain the digital data D_d, such that the model number of the ink cartridge may be clearly known.

In view of above, it can be known that in the present embodiment, for both the controller 200 and the peripheral unit 400, the data to be transmitted need to be converted into an analog voltage signal first before transmitting through the transmission interface 300. A digital-to-analog converting relation and the time length of the preset time slot may be customized by both the controller 200 and the peripheral unit 400 through a mutual agreement. Therefore, a higher security may be provided since the data transmitted through the transmission interface cannot be easily analyzed even by using the logic analyzer.

Figure 5:
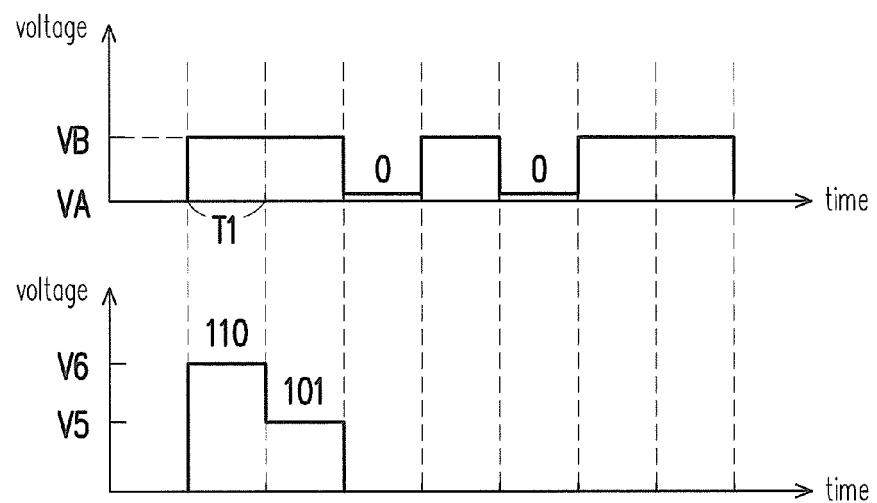
FIG. 5 is a schematic diagram illustrating a comparison between transmission of the analog signal and transmission of the digital signal according to an exemplary embodiment.

Furthermore, based on the data transmission method of the exemplary embodiments, one preset time slot is capable of transmitting a data symbol including more than one bit, thus a data transmission speed may be increased. More specifically, FIG. 5 is a schematic diagram illustrating a comparison between transmission of the analog signal and transmission of the digital signal according to an exemplary embodiment. Referring to FIG. 5, in case a decimal data to be sent by the controller 200 is '53', '53' may be converted in to a bit data being '110101' through binary system, and converted into a bit data being '65' through octal system. In a digital data transmission method of conventional art, it is assumed that the bit data '0' may be represented by the voltage VA, the bit data '1' may be represented by the voltage VB, and a transmission time slot for one single bit is T1. As shown in FIG. 5, the controller 200 requires the time length being "6*T1" to complete a transmission for the decimal data '53'.

In comparison, in the exemplary embodiments, assuming that the first digital-to-analog converter 210 of the controller 200 is of 8 stages, the controller 200 may use 8 voltage levels to represent different symbols. Each of the voltage levels may represent the symbol including three bit data, in which a detailed converting relation is, for example, identical to the converting relation depicted in FIG. 4, and a transmission time slot for one single symbol is also T1. Accordingly, the controller 200 only requires the time length being "2*T1" for sending the analog signals of the voltage level V6 and the voltage level V5 to complete the data transmission. Accordingly, because a number of the data bit to be transmitted during one single time slot is increased, the data transmission speed may be increased.

It should be noted that, in the data transmission method proposed by the exemplary embodiments, the peripheral unit may transmit and decode the data according to the signal transmission format being set in advance. In other words, the time length of the preset time slot and each of the voltage levels representing different data may be set in the controller and the peripheral unit by using a predefined method. Accordingly, the controller and the peripheral unit may directly perform the data transmission without transmitting additional setting signals or notification messages. On the other hand, in case the peripheral unit is not provided with information regarding the signal transmission format, the controller may also send a setting signal in advance to inform the peripheral unit about the signal transmission format, so that transmission and encoding/decoding of the data may be performed later on. Another embodiment is provided below to further describe the disclosure.

Figure 6:
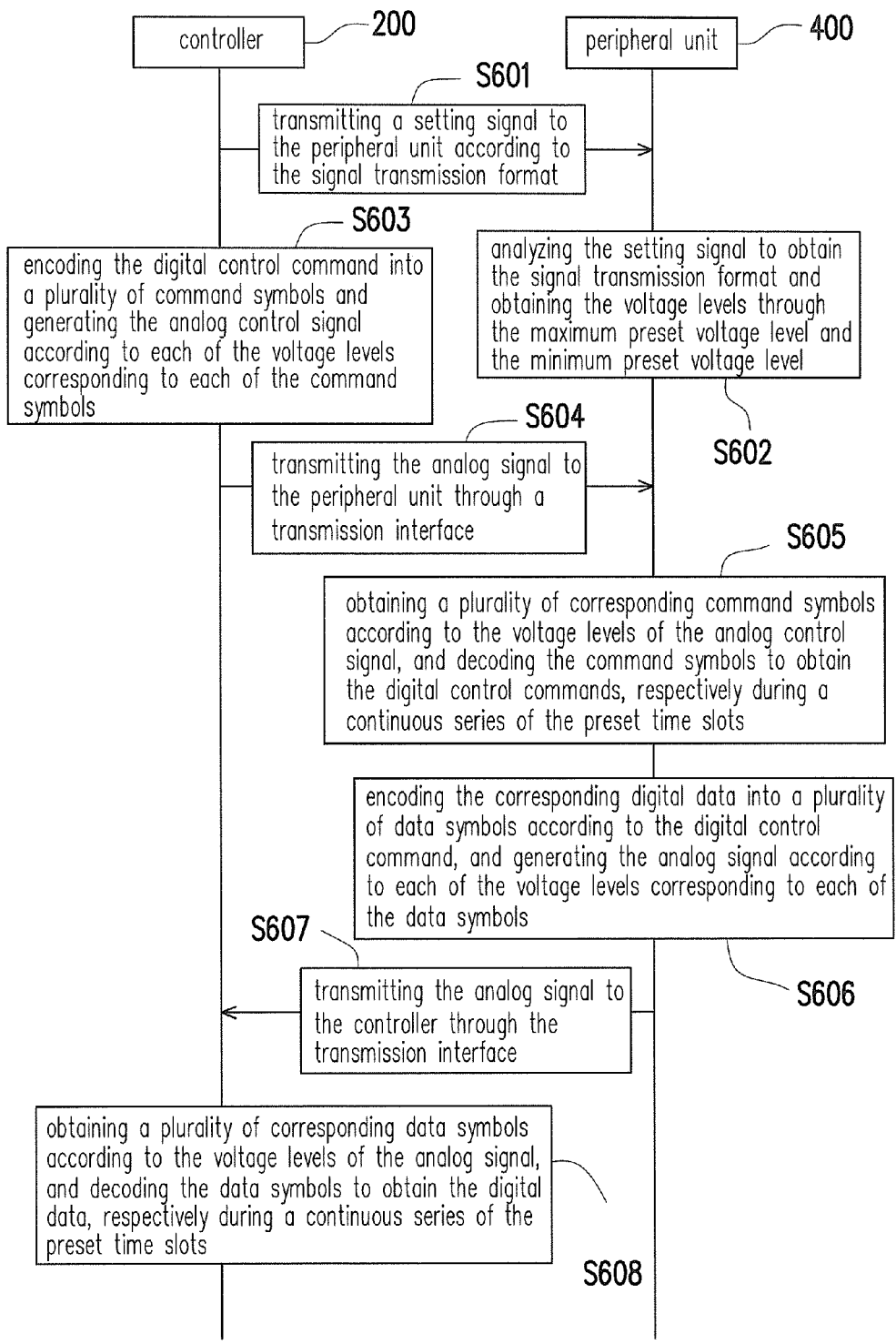
FIG. 6 is a flowchart illustrating a timing sequence of a data transmission method according to another exemplary embodiment.

FIG. 6 is a flowchart illustrating a timing sequence of a data transmission method according to another exemplary embodiment. A method of the present embodiment is suitable for the printing system 10 of FIG. 1. The following detailed steps are elaborated to describe the method of the present embodiment with the reference to each element in FIG. 1. Referring to FIGS. 1 and 6 together, Nevertheless, for convenience of illustration, a digital-to-analog converting method of 8 stages and a analog-to-digital converting method of 8 stages are used to described the following embodiment as an example, but the disclosure is not limited thereto.

Figure 7A:
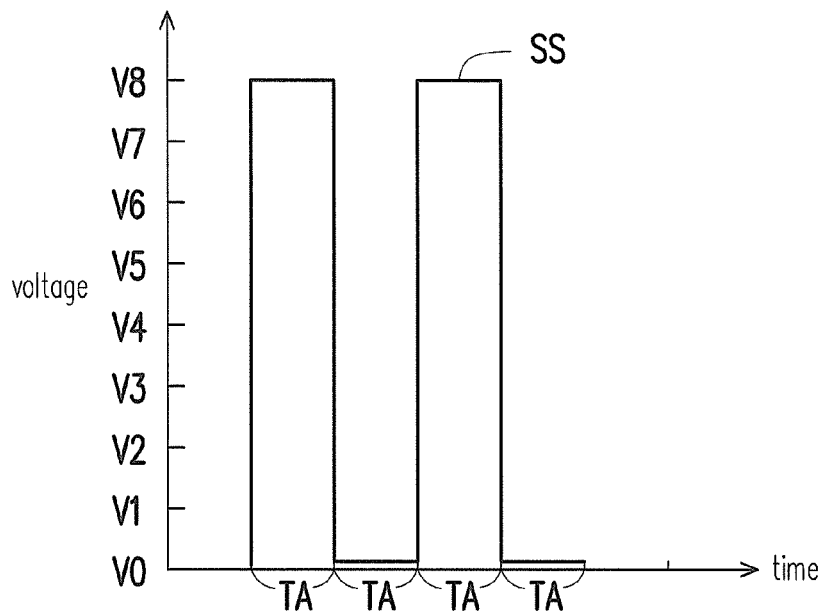
FIG. 7A is a schematic diagram illustrating an example of a setting signal.

First, in step S601, the controller 200 transmits a setting signal to the peripheral unit 400 according to the signal transmission format. A half period of the setting signal is the time length of the preset time slot, and the setting signal includes a maximum preset voltage level and a minimum preset voltage level. For instance, FIG. 7A is a schematic diagram illustrating an example of a setting signal. As shown in FIG. 7A, a half period of a setting signal SS is a preset time slot TA, and a maximum preset voltage level V8 and a minimum preset voltage level V0 of the setting signal SS are alternately changed at intervals of neighboring time slots. In other words, the controller 200 sends a voltage signal having the maximum preset voltage level V8 and a voltage signal having the minimum preset voltage level V0 alternately in a continuous series of four preset time slots TA.

In step S602, the peripheral unit 400 analyzes the setting signal to obtain the signal transmission format, and obtains the voltage levels through the maximum preset voltage level and the minimum preset voltage level. In brief, when the setting signal is received by the peripheral unit 400, the time length of the preset time slot, the maximum preset voltage level and the minimum preset voltage level may also be known. In addition, the voltage levels representing different data may also be calculated by the peripheral unit 400 according to the maximum preset voltage level and the minimum preset voltage level. In the present embodiment, the peripheral unit 400 may obtain the corresponding voltage levels by dividing voltage differences of voltages between the maximum preset voltage level and the minimum preset voltage level equally. As shown in FIG. 7A, assuming that the minimum voltage level V0 is equal to 0 volt, the voltage level V4 is then equal to the voltage level multiplied by fifty percent. Based on such rule, the peripheral unit 400 may obtain the voltage levels V1 to V7 from the maximum preset voltage level V8 and the minimum preset voltage level V0.

Accordingly, the peripheral unit 400 may know the time length of the preset time slot and the voltage levels in the signal transmission format through transmission of the setting signal. In another embodiment, if the preset time slot and the voltage levels are already customized by the controller 200 and the peripheral unit 400 through the agreement, it is not required for the controller 200 to transmit the setting signal to the peripheral unit 400. However, in application environment where lines have poorer quality, a voltage loss may occur on the voltage signals between the controller 200 and the peripheral unit 400 due to line impedance. In this case, if the controller 200 and the peripheral unit still perform a data interpretation by using the voltage levels set in advance by both ends, a data misjudgment may occur during a analog-to-digital conversion.

More specifically, in the embodiment depicted in FIG. 6, the setting signal sent by the controller 200 in advance may also require said lines for transmission. Therefore, factors causing the voltage loss may be taken into account while the voltage levels are analyzed by the peripheral unit 400 through the setting signal. Accordingly, the problem of the data misjudgment due to poor performance of the lines may be solved.

While (or after) the setting signal is sent to the peripheral unit by the controller 200, in step S603, the first digital-to-analog converter 210 of the controller 200 encodes the digital control command into a plurality of command symbols, and generates the analog control signal according to each of the voltage levels corresponding to each of the command symbols. Detailed description of the digital analog conversion has been described in the foregoing embodiments and is not repeated hereinafter. It should be noted that, a part or all of the command symbols may include a check code. The check code is a data confirmation information generated through an error checking mechanism such as checksum or parity check, but the disclosure is not limited thereto.

In brief, when the controller 200 intends to send the control command, an encoding operation regarding the error checking mechanism may be performed on the digital control command in advance, so as to generate the corresponding check code. Next, the controller 200 may incorporate the check code into an original data of the digital control command, and encode the digital control command including the check code into the command symbols according to the signal transmission format. Therein, a number of bits included in each of the symbols is decided based on a number of the voltage levels in the signal transmission format. Lastly, the controller 200 may generate the corresponding analog control signal according to the command symbols.

Figure 7B:
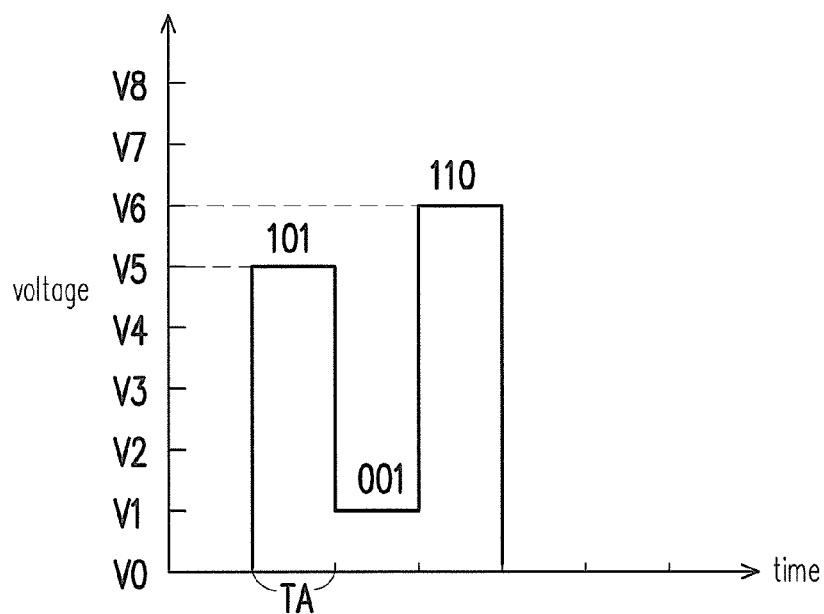
FIG. 7B is a schematic diagram illustrating an example of an analog control signal.

For instance, FIG. 7B is a schematic diagram illustrating an example of an analog control signal. It is assumed that the controller 200 adds the check code of one bit after every 8 bits, and the digital control command for adding the check code is "101001110". As such, the controller 200 may encode the digital control command for adding the check code "101001110" into three command symbols, which are the command symbol "101", the command symbol "001" and the command symbol "110", respectively. Accordingly, as shown in FIG. 7B, the voltages of the analog control signal in the continuous series of the preset time slots TA are the voltage level V5 representing the command symbol "101", the voltage level V1 representing the command symbol "001" and the voltage level V6 representing the command symbol "110", respectively in that sequence.

In step S604, the controller 200 transmits the analog control signal to the peripheral unit 400 through the transmission interface 300. In step S605, the first analog-to-digital converter 410 of the peripheral unit 400 obtains a plurality of corresponding command symbols according to the voltage levels of the analog control signal, and decodes the command symbols to obtain the digital control commands, respectively during a continuous series of the preset time slots. In other words, the peripheral unit 400 may obtain the digital control command by decoding the command symbols to know of what is the command issued by the controller 200.

In step S606, the second digital-to-analog converter 430 of the peripheral unit 400 encodes the corresponding digital data into a plurality of data symbols according to the digital control command, and generates the analog signal according to each of the voltage levels corresponding to each of the data symbols. Similarly, a part or all of the data symbols may also include a check code. A generating method regarding the analog signal is similar to that of the analog control signal, and may be inferred with reference to the foregoing description by person skilled in the art may, thus it is not repeated herein.

In step S607, the peripheral unit 400 transmits the analog signal to the controller 200 through the transmission interface 300. In step S608, the second analog-to-digital converter 230 of the controller 200 obtains a plurality of corresponding data symbols according to the voltage levels of the analog signal, and decodes the data symbols to obtain the digital data, respectively during a continuous series of the preset time slots.

Figure 7C:
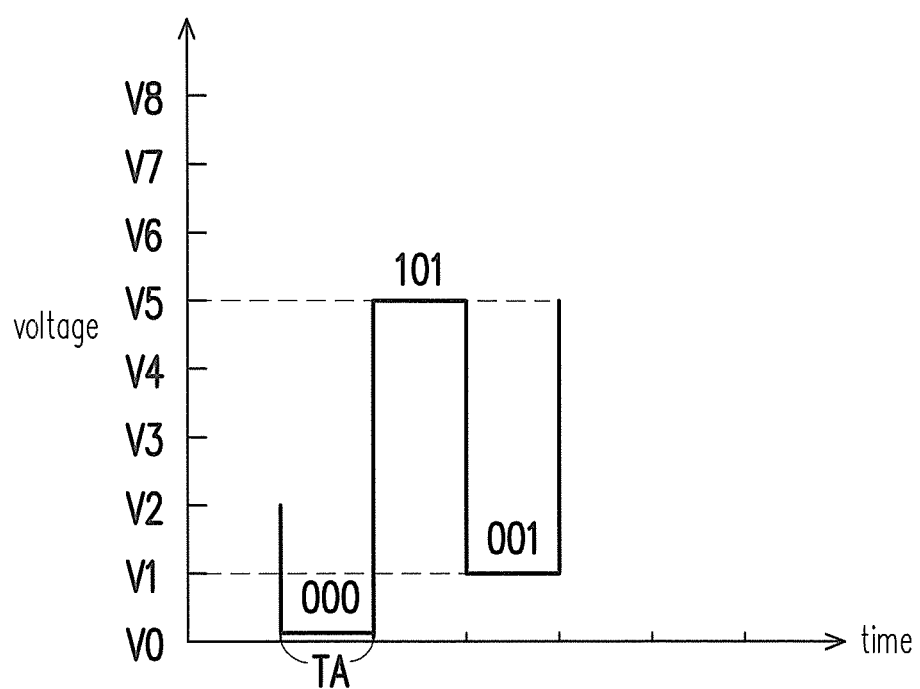
FIG. 7C is a schematic diagram illustrating an example of an analog signal.

For instance, FIG. 7C is a schematic diagram illustrating an example of an analog signal. As shown in FIG. 7C, the voltages of the analog signal in the continuous series of the preset time slots TA are the voltage level V0 representing the data symbol "000", the voltage level V5 representing the data symbol "101" and the voltage level V1 representing the data symbol "001", respectively in that sequence. Therefore, when the analog signal as depicted in FIG. 7C is received by the controller 200, the controller 200 may obtain the corresponding data symbol "000", the data symbol "101" and the data symbol "001" according to the voltage level V0, the voltage level V5 and the voltage level V1, respectively. In other words, the controller 200 may know that the digital data for adding the check code is "000101001", and utilize the checking mechanism agreed by both the controller 200 and the peripheral unit 400 to determine whether there are errors occurred during the transmission.

Based on above, the printing system and the data transmission method thereof according to the exemplary embodiments is capable of converting the digital data into the corresponding analog voltage signals through a customized encoding method, and then transmitting the analog voltage signals through a customized transmission interface. Accordingly, the data transmitted between the controller and the peripheral unit cannot be obtained even by using the logic analyzer, so that the confidentiality and the security for the data in the printing system may be improved. Moreover, based on the data transmission method of the exemplary embodiments, the controller and the peripheral unit may transmit more data within one single time slot, such that the data transmission speed may be significantly increased.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A printing system, comprising:
    a peripheral unit, configured to execute a data printing function and including a digital data; and
    a controller coupled to the peripheral unit, converting a digital control command to obtain an analog control signal, and transmitting the analog control signal to the peripheral unit,
    wherein the peripheral unit coverts the analog control signal into the digital control command when the analog control signal is received by the peripheral unit, and the peripheral unit converts the corresponding digital data into an analog signal according to the digital control command to transmit the analog signal to the controller.

2. The printing system of claim 1, wherein the digital control command is converted into the analog control signal having a plurality of voltage levels according to a signal transmission format, and the digital data is converted into the analog signal according to the signal transmission format, wherein the signal transmission format comprises a time length of a preset time slot and the voltage levels.

3. The printing system of claim 2, wherein the controller comprises:
    a first digital-to-analog converter, converting the digital control command into the analog control signal having the voltage levels according to the signal transmission format, and transmitting the analog control signal to the peripheral unit,
    wherein the first digital-to-analog converter encodes the digital control command into a plurality of command symbols, and generates the analog control signal according to each of the voltage levels corresponding to each of the command symbols.

4. The printing system of claim 3, wherein a part or all of the command symbols comprise a check code.

5. The printing system of claim 2, wherein the peripheral unit comprises:
    a first analog-to-digital converter, converting the analog control signal transmitted by the controller and including the voltage levels into the digital control command according to the signal transmission format,
    wherein the first analog-to-digital converter obtains a plurality of corresponding command symbols according to the voltage levels of the analog control signal respectively during a continuous series of the preset time slots, and decodes the command symbols to obtain the digital control command.

6. The printing system of claim 2, wherein the peripheral unit comprises:
    a second digital-to-analog converter, converting the digital data into the analog signal having the voltage levels according to the signal transmission format, and transmitting the analog signal to the controller,
    wherein the second digital-to-analog converter encodes the corresponding digital data into a plurality of data symbols according to the digital control command, and generates the analog signal according to each of the voltage levels corresponding to each of the data symbols.

7. The printing system of claim 6, wherein a part or all of the data symbols comprise a check code.

8. The printing system of claim 2, wherein the controller comprises:

a second analog-to-digital converter, converting the analog signal transmitted by the peripheral unit and including the voltage levels back into the digital data according to the signal transmission format, wherein the second analog-to-digital converter obtains a plurality of corresponding data symbols according to the voltage levels of the analog signal respectively during a continuous series of the preset time slots, and decodes the data symbols to obtain the digital data.

9. The printing system of claim 2, wherein the controller transmits a setting signal to the peripheral unit according to the signal transmission format, wherein a half period of the setting signal is the time length of the preset time slot, and the setting signal comprises a maximum preset voltage level and a minimum preset voltage level.

10. The printing system of claim 9, wherein the peripheral unit analyzes the setting signal to obtain the signal transmission format, and obtains the voltage levels according to the maximum preset voltage level and the minimum preset voltage level, so as to obtain the digital control command through the voltage levels and convert the digital data through the voltage levels.

11. A data transmission method adapted to a printing system, the printing system comprising a peripheral unit and a controller, and the data transmission method comprising:
converting a digital control command to obtain an analog control signal by the controller;
transmitting the analog control signal to the peripheral unit by the controller;
converting the analog control signal back into the digital control command by the peripheral unit when the analog control signal is received by the peripheral unit; and
converting a corresponding digital data into an analog signal by the peripheral unit according to the digital control command to transmit the analog signal to the controller.

12. The data transmission method of claim 11, wherein the digital control command is converted into the analog control signal having a plurality of voltage levels according to a signal transmission format, and the digital data is converted into the analog signal according to the signal transmission format, wherein the signal transmission format comprises a time length of a preset time slot and the voltage levels.

13. The data transmission method of claim 12, wherein the step of converting the digital control command to obtain the analog control signal by the controller comprises:
encoding the digital control command into a plurality of command symbols and generating the analog control signal according to each of the voltage levels corresponding to each of the command symbols by the controller, wherein a part or all of the command symbols comprise a check code.

14. The data transmission method of claim 12, wherein the step of converting the corresponding digital data into the analog signal by the peripheral unit according to the digital control command comprises:
encoding the corresponding digital data into a plurality of data symbols according to the digital control command, and generating the analog signal according to each of the voltage levels corresponding to each of the data symbols by the peripheral unit, wherein a part or all of the data symbols comprise a check code.

15. The data transmission method of claim 12, further comprising:
converting the analog signal transmitted by the peripheral unit and including the voltage levels back into the digital data by the controller according to the signal transmission format.

16. The data transmission method of claim 12, wherein before the step of transmitting the analog control signal to the peripheral unit by the controller, the method further comprises:
transmitting a setting signal to the peripheral unit by the controller according to the signal transmission format, wherein a half period of the setting signal is the time length of the preset time slot, and the setting signal comprises a maximum preset voltage level and a minimum preset voltage level.

17. The data transmission method of claim 16, wherein after the step of transmitting the setting signal to the peripheral unit by the controller according to the signal transmission format, the method further comprises:
analyzing the setting signal to obtain the signal transmission format and obtaining the voltage levels through the maximum preset voltage level and the minimum preset voltage level by the peripheral unit.

* * * * *